(12) United States Patent
Nie et al.

(10) Patent No.: US 7,444,488 B2
(45) Date of Patent: Oct. 28, 2008

(54) METHOD AND PROGRAMMABLE UNIT FOR BIT FIELD SHIFTING

(75) Inventors: Xiaoning Nie, Neubiberg (DE); Thomas Wahl, Fulda (DE)

(73) Assignee: Infineon Technologies, Munich (DE)

( * ) Notice: Subject to any disclaimer, the term of this patent is extended or adjusted under 35 U.S.C. 154(b) by 398 days.

(21) Appl. No.: 11/241,844

(22) Filed: Sep. 30, 2005

(65) Prior Publication Data
US 2006/0101248 A1 May 11, 2006

Related U.S. Application Data

(63) Continuation of application No. PCT/EP2004/003063, filed on Mar. 23, 2004.

(30) Foreign Application Priority Data
Apr. 2, 2003 (DE) .................. 103 14 928

(51) Int. Cl.
*G06F 12/00* (2006.01)
(52) U.S. Cl. .................. 711/165; 711/166; 711/168; 711/169; 711/200; 711/211; 711/220; 712/8; 712/9; 712/42; 712/200; 712/204; 712/229; 712/230; 712/300
(58) Field of Classification Search .................. 711/165, 711/166, 200, 212, 220, 168–169; 712/42, 712/200, 204, 224, 8–9, 229–230, 300
See application file for complete search history.

(56) References Cited

U.S. PATENT DOCUMENTS 4,941,085 A 7/1990 Sakamura et al.
5,121,474 A * 6/1992 Sakamura et al. ............. 712/42
5,210,835 A * 5/1993 Sakamura et al. ........... 712/224
5,357,620 A * 10/1994 Suzuki ....................... 711/220
5,765,216 A 6/1998 Weng et al.
6,061,783 A 5/2000 Harriman (Continued)

FOREIGN PATENT DOCUMENTS

EP 0 382 246 8/1990

OTHER PUBLICATIONS

Karl M. Guttag et al. "The TMS34010 A Embedded Microprocessor", 4pp., vol. 8, Issue 3, IEEE Micro, Jun. 1998.

(Continued)

*Primary Examiner*—Sanjiv Shah
*Assistant Examiner*—Zhuo H Li
(74) *Attorney, Agent, or Firm*—Brinks Hofer Gilson & Lione

(57) ABSTRACT

A method and a programmable unit for bit field shifting in a memory device in a programmable unit as a result of the execution of an instruction, in which a bit segment is shifted within a first memory unit to a second memory unit, are presented. The bit segment is read with a first bit length from a first bit field in the first memory unit starting at a first start point. The bit segment that has been read is stored in the first bit field in the second memory unit starting at a second start point. The first or the second start points is updated by a predetermined value and the updated start point is stored for subsequent method steps.

29 Claims, 5 Drawing Sheets

U.S. PATENT DOCUMENTS 6,128,725 A * 10/2000 Leach .................... 712/200
6,332,188 B1 * 12/2001 Garde et al. ............ 712/204

OTHER PUBLICATIONS

International Preliminary Report from corresponding International Application No. PCT/EP2004/003063.

International Examination Report from corresponding International Application No. PCT/EP2004/003063.

J.S. Shapiro, base/lib/unix/lib/strepy.c., http:/www.eros-os/eros-src/base/lib/unix/strcpy.c, p. 1, 1999.

German Office Action from corresponding German application No. 103 14 928.7-3.

* cited by examiner

METHOD AND PROGRAMMABLE UNIT FOR BIT FIELD SHIFTING

PRIORITY CLAIM

This application is a continuation of International Application PCT/EP2004/003063, filed on Mar. 23, 2004, which claims the benefit of priority to German Patent Application 103 14 928.7 filed on Apr. 2, 2003, both of which are herein incorporated by reference in their entirety.

TECHNICAL FIELD

The invention relates to a method and a programmable unit for bit field shifting in a memory device in a programmable unit, in particular for bit field manipulation.

BACKGROUND

Microprocessors, microcontrollers, and signal processors are examples of programmable units. The processor architecture which is chosen for the programmable unit, in conjunction with the respectively chosen compiler technology and the respective application, essentially governs the performance, the speed and the flexibility of the programmable unit.

An assembler programming language which has a fixed instruction set based on a register model is available to the user of the programmable unit for hardware-related programming.

Examples of programmable units such as these are the processors in the C166 family with a 16-bit architecture, as well as TriCore, with a 32-bit architecture from Infineon Technologies AG. These programmable units have a memory device, an instruction decoding, address and data register, a pipeline as well as a barrel shifter (register that is able to shift its content by up to as much bits as the length of the register allows) and bit mask generator for processing of the bit instructions. Modern programmable units, in particular processors with a pipeline architecture or protocol processors, have bit field manipulation as an additional functionality. In bit field manipulation, a bit segment comprising one or more bits which is or are contained in a first data string is taken from the first data string, is processed, and is inserted into a corresponding bit field in a second data string. A data string may, for example, contain a word (32 bits), a double word (64 bits), a half-word (16 bits), etc.

With regard to the general background of programmable units with bit field manipulation, reference is made to U.S. Pat. No. 6,061,783, US Patent Application US 2002/0120828 A1 and the specification for the TriCore microcontroller, as mentioned initially, from Infineon Technologies AG. The entire contents of these documents relating to bit field manipulation are herein incorporated by reference.

One normal instruction for bit field manipulation is the "Move" instruction, in which a number of bits are taken from a first data word and, after appropriate modification, are inserted into a second data word. This "Move" instruction for bit field manipulation has the following structure in the assembler programming language:

MVR R #offset1 Rs #offset0 #bits

The "Move" instruction MVR results in a bit segment with a bit length of #bits being moved from the source register Rs at the bit position #offset0 to the destination register Rd at the bit position #offset1. In formal terms, this operation is described as follows:

Rd(#bits, #offset1)<=Rs(#bits, #offset0)

A large number of individual program codes are required in order to implement this "Move" instruction with a simple instruction set. This implementation of the "Move" instruction will be described by way of example in the following text:

| | | |
|---|---|---|
| mvr | R2 0 R1 0 8 | // take first byte |
| addi | R3 R2 1 | // process the byte |
| str | R15 R3 | // store the result |
| mvr | R2 0 R1 8 8 | // take the second byte, etc. |
| addi | R3 R2 1 | |
| str | R15 R3 | |
| mvr | R2 0 R1 16 8 | |
| addi | R3 R2 1 | |
| str | R15 R3 | |
| mvr | R2 0 R1 24 8 | |
| addi | R3 R2 1 | |
| str | R15 0 R3 32 0 0 | |

The first line in the program indicates that a first byte (8 bits) should be taken at the bit position 0 at a first point R1 in the source register, and should be moved to a bit position at a second point R2. The second line indicates that this bit is in fact processed (added) at the second point R2. The result R3 of the previous process step is inserted at the point R15 in the destination register, and is stored (third line). These process steps are repeated until all 32 bits, that is to say the entire word, have been taken from the source register, have been processed and have been written to the destination register. In a corresponding manner, therefore, the second byte is taken at the bit position 8, and is passed on, on the basis of the fourth line in the above program.

As can be seen, a total of 12 instruction steps (program codes) are required in this case for the simple function of the "Move" instruction. One disadvantage of a large number of instruction steps is that the instruction memory becomes larger. Owing to frequent accesses to the instruction memory, this leads directly to more energy being consumed. Furthermore, a large number of instruction steps also leads to a correspondingly physically large memory, which in the end also increases the chip area and therefore additionally makes the entire programmable unit more expensive.

The above problem has been described for a programmable unit with direct register addressing. With this type of addressing, the address (or the number) of the register is indicated directly as an (immediate) value.

Furthermore, register-indirect addressing also exists, in which the address of the register is the content of another register. This type of addressing has the advantage over direct addressing that the operand address need not be read at the same time when fetching the instruction. This is used when the same operand address is accessed frequently within one program section.

One development is register-indirect addressing with displacement, in which the current address is calculated from the content of an address register by a constant address displacement (displacement). This address displacement is signed (two's complement) and thus allows a positive as well as a negative address displacement from the base address in the address register. This method is used for those data accesses which occur in a fixed structure in the memory. The same element in the next data set is thus accessed by changing the base address in the address register, or a variable base address can be taken into account.

Processors without the capability for indirect memory addressing would, for example, have to store three individual bits in a data word with a length of 32 bits, for a 32-bit memory. The other 29 bits of this data word then remain unused. This form of indirect data addressing, which is also referred to in the following text as bit field access to the data memory, thus significantly reduces the memory size of the data memory, and thus also the chip area. Such bit field access to the data memory does not, however, have any loop with sequential access to individual bit structures since the bit positions and their offset value are predetermined as constant values (so-called immediate values) for each of the accesses. One problem that is associated with this is also that the number of memory accesses always remains the same, so that no energy is saved in comparison to conventional memory accesses.

This problem will be illustrated using the following program, which describes the initially described "Move" instruction MVR for register-indirect addressing:

```
ldi    R1 0 0x030    // load read pointer = 0x30
ldi    R3 0 0x040    // load write pointer = 0x40
ldr    R2 0 R1 0 8   // take first byte
nop
nop
addi   R3 R2 1       // process the byte
str    R15 R3        // store the result
ldr    R2 0 R1 8 8   // take the second byte
nop
nop
addi   R3 R2 1
str    R15 R3
ldr    R2 0 R1 16 8  // take the third byte
nop
nop
addi   R3 R2 1
str    R15 R3
ldr    R2 0 R1 24 8  // take the fourth byte
nop
nop
addi   R3 R2 1
str    R15 0 R3 32 0 0
```

The first two lines indicate that a read pointer and a write pointer to the corresponding points R1, R3 are loaded. The first byte is then loaded (third line). After two program steps (fourth and fifth lines) in which no operation is provided, the byte that has been read is processed in the sixth line, and is stored as the result in the seventh line. This procedure is repeated until all four bytes have been read. This therefore results in a total of 22 instruction steps for the "Move" instruction, that is to say in order to shift a single word comprising 32 bits out of the memory. However, a large number of instruction steps and frequent accesses to the memory lead to the programmable unit having a high power consumption and, in addition, lead to a large chip area.

When using a programmable unit, in particular a programmable unit with a fixed instruction set, there is thus a need to carry out frequently recurring functions more effectively within a program to be executed.

SUMMARY

By way of introduction only, a method is presented for bit field shifting in a memory device in a programmable unit as a result of the execution of an instruction, in which a bit segment is shifted within a first memory unit to a second memory unit. The method includes reading the bit segment with a first bit length from a first bit field in the first memory unit starting at a first start point; storing the bit segment that has been read in a first bit field in the second memory unit starting at a second start point; updating at least one of the first or the second start points by a predetermined value; and storing the at least one of the first or the second start points for subsequent method steps.

In another embodiment, a programmable unit for processing instructions in a processor is presented. The programmable unit includes: a memory in which instructions are stored; a memory unit from which at least one of a bit segment or a bit field can be at least one of read or written to again; an additional register for storage of at least one of an updated first start point or an updated second start point; a device for calculation of at least one of a current first start point or a current second start point; and a device for bit field manipulation, which shifts the bit segment within a first bit field to an area in a second bit field.

In these embodiments, frequently recurring program steps are not continuously downloaded again from a memory or a register. They are instead embedded in a program loop. When there are a large number of recurring program steps, this makes it possible to significantly reduce the number of instructions required for this purpose. A reduction in the individual program steps and program functions results in a reduction in the power consumption and, furthermore, because the memory is smaller, also in a reduction in the memory size.

Both in the case of register-indirect addressing of a memory and in the case of direct register addressing, the memory accesses and register accesses are kept very low. Updating of the bit position pointer is provided for the implementation of this functionality.

For this additional functionality, the last or alternatively also the next bit position be stored as a bit position pointer (start point). For recurring program sections, this bit position pointer indicates the point at which the data should be stored or should be read. This is achieved by incrementation of a fixed offset with the last bit position pointer, which is stored in the additional register. The new bit position pointer is thus obtained from the old, stored bit position pointer plus the predetermined offset or the predetermined bit length.

An additional register is introduced for bit field manipulation in the event of direct addressing. This additional register includes the functionality of a program loop in that it retains the bit position at which the next bit segment should be read after reading one bit segment from a data string. The provision of this additional register for storage of the last bit position does not change the number of register connections.

The existing functionality is extended, particularly for sequential reading of data from a memory, by using variable bit positions. A programmable unit architecture is provided for this purpose, which stores the most recently read data (sequentially) in a cache memory, thus further reducing the power consumption, because of the lack of memory accesses that this results in. Thus, in this case, this is a data cache memory.

The foregoing summary has been provided only by way of introduction. Nothing in this section should be taken as a limitation on the following claims, which define the scope of the invention.

BRIEF DESCRIPTION OF THE FIGURES

The application will be described below in greater detail on the basis of preferred embodiments and with reference to the accompanying drawings, in which.

Identical and functionally identical elements and signals are provided with the same reference symbols in all of the figures, unless stated to the contrary.

DETAILED DESCRIPTION

The present invention provides for the introduction of a program loop for recurring program steps and program blocks for a programmable unit with a pipeline architecture. This loop is possible without the provision of additional register connections. The program which results from this has the following functionality:

Rd(#bits, offset1_reg) <= Rs(#bits, offset0_reg)
offset0_reg <= (offset_reg + #offset0)
offset1_reg <= (offset1_reg + #offset1)

In this case, Rs denotes the source register (register source) and Rd the destination register (register destination). Offset0_reg and offset1_reg each denote the bit position pointers for the corresponding registers. #bits denotes the bit length and #offset0 and #offset1, respectively, denote the respective offset in the source register and destination register at which the respective bit position pointers respectively read or insert the corresponding bit segments in a subsequent read or insertion step. The first line thus includes the aim of a bit segment with a bit length of #bits at the point offset0_reg being moved from the source register to the point offset1_reg. The next two lines denote the method, for which the two current bit position pointers for the source register and destination register are obtained from the addition of the respective previously used bit position pointer with the corresponding offset.

The syntax for the corresponding program in the assembler programming language is as follows:

*MVRSO Rd #offset1 Rs #offset0 #bits*

In a simplified implementation, this results in a program with the following steps:

| | | |
|---|---|---|
| init | 1 0 0 0 0 | |
| ldi | R4 0 3 | // load counter = 3 |
| _loop: mvrso | R2 0 R1 8 8 | |
| addi | R3 R2 1 | |
| str | R15 R3 | |
| decibr | R4 1 _loop 1 | // decrement with 1; jump instruction when counter = 0 |

On the basis of line 1 of the program, the register locations are preloaded by being initialized. The count of a counter is set to three in line two. Lines 3 to 6 include the program loop in which case, on the basis of line 3, in each case one byte is read from and written to the corresponding bit position in the source register. The offset register is then updated. The content of R3 is stored in the program line 5 at the address which is contained in R15 (indirect addressing). The last line 6 in each case decrements the count by one. Furthermore, the loop is intended to be continued from line three again until the count becomes zero. The simple insertion of a loop reduces the number of instructions required for the "Move" instruction MVR to a total of 6, in comparison to the 12 instructions required initially for this purpose.

Figure 1:
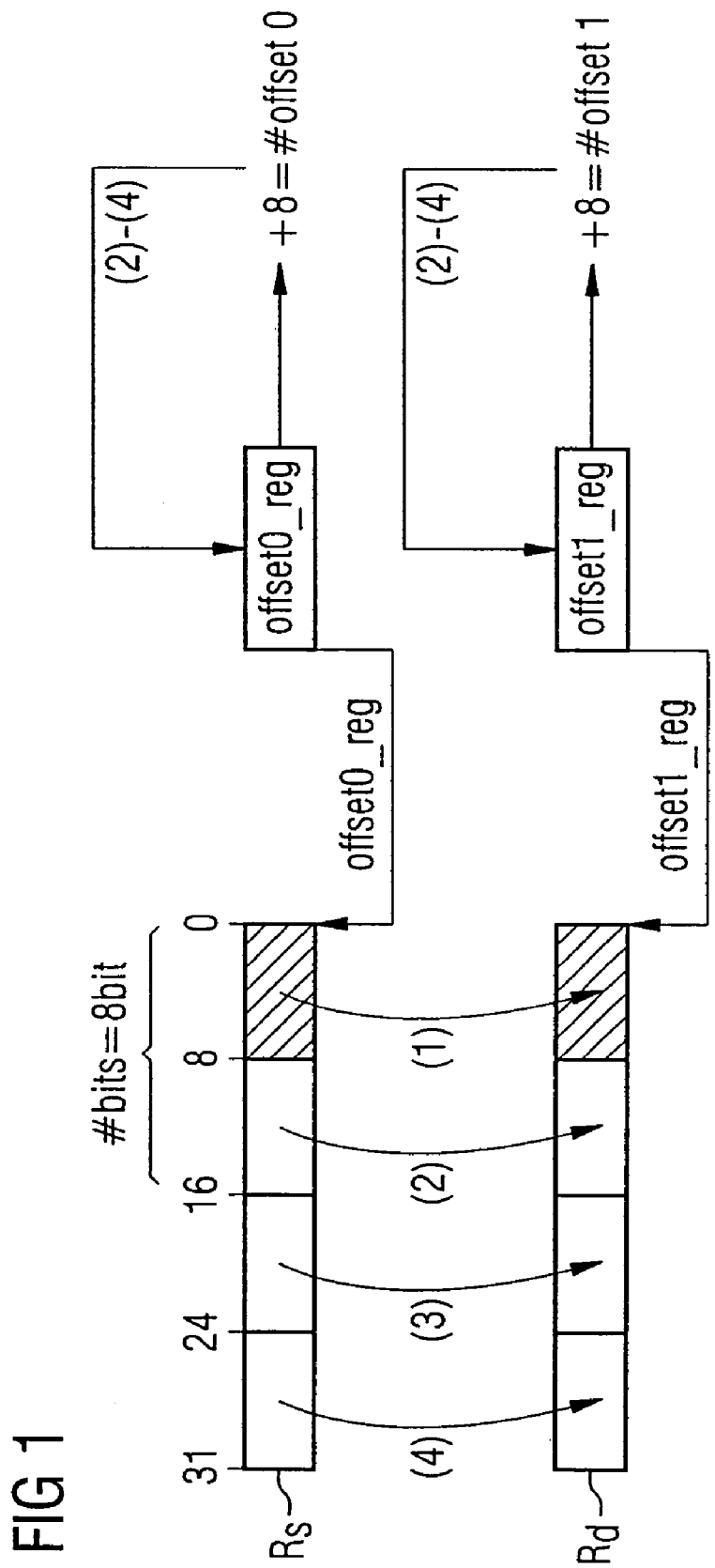
FIG. 1 shows a schematic illustration in order to clarify the method according to the invention for bit field manipulation with direct addressing.

In the above program procedure, the loop is made possible by updating the bit position pointers offset0_reg, offset1_reg associated with the source register and destination register Rs, Rd. FIG. 1 shows a schematic illustration, in order to clarify this method.

In FIG. 1, Rs and Rd respectively denote a data word from the source register and from the destination register. First of all, the bit position pointers offset0_reg, offset1_reg are initialized, that is to say in the present case they are set to 0. In a first step (1), the first byte (#bits=8 bits) is written, starting from the start position which is defined by the bit position pointer offset0_reg=0 bits, to a corresponding area of the destination register Rd, starting with the start position which is defined by the bit position pointer offset1_reg=0 bits. In the second step (2), the second byte is written from the source register Rs to the destination register Rd. The start positions which define the position at which the second byte is read from or written to are once again determined by the bit position pointers offset0_reg, offset1_reg. However, these values of the bit position pointers will have been updated before the second step (2) by the values of the respective old bit position pointers, that is to say offset0_reg and offset1_reg, being updated by the addition of a respective offset value #offset0, #offset1. In the present example, both offset values are identical, and are #offset0=#offset1=8 bits. These updated bit position pointers offset0_reg, offset1_reg are thus used in the second step (2) for determination of the start position. The bit position pointers offset0_reg, offset1_reg are appropriately updated for the further bytes (steps (3), (4)).

An additional register is provided in order to update the respective bit position pointer values. The design of a programmable unit with an additional register such as this for storage of the respective updated bit position pointer values will be explained in more detail in the following text with reference to FIGS. 2 and 3.

Figure 2:
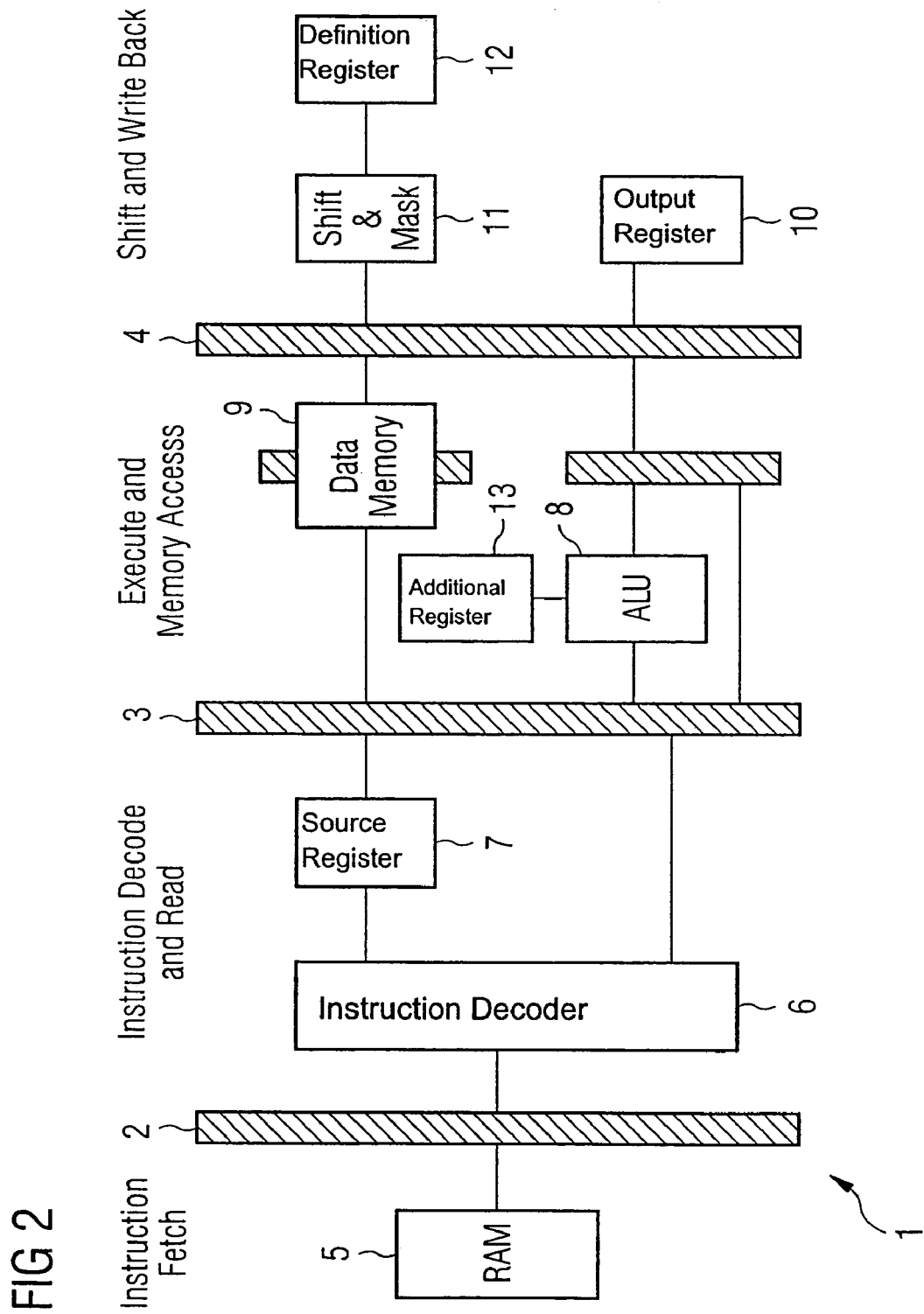
FIG. 2 uses a block diagram to show the pipeline architecture of the programmable unit according to the invention.

FIG. 2, in this case, uses a block diagram to show the pipeline architecture of a programmable unit according to the invention with an additional register. The reference symbol 1 in FIG. 2 denotes the corresponding programmable unit, which in this case is in the form of a pipeline processor. A three-stage pipeline is provided in the present exemplary embodiment. The reference symbols 2 to 4 in this case denote the various pipeline registers for the individual pipeline stages. The programmable unit 1 contains an instruction memory 5 in which a fixed instruction set is stored. The instruction memory 5 is connected to an instruction decoder 6 via the pipeline stage 2. The instruction decoder 6 is followed by the source register 7, from which data is read as a function of the instructions decoded by the instruction decoder 6, with the data being supplied to a computation unit 8 via the pipeline stages 3. The computation unit 8 is in this case in the form of an arithmetic logic unit (ALU). A data memory 9 can also be provided in the second pipeline stage 3, and its input side is likewise coupled to the source register 7. The ALU unit 8 and the data memory 9 are connected via the pipeline stage 4 on the one hand to output connections 10 and on the other hand to a barrel shifter 11. The barrel shifter 11 contains a device for bit field manipulation, and its output side is coupled to the destination register 12.

An additional register 13 is provided for the implementation of the functionality, as described above with reference to FIG. 1, for updating the bit position pointers for the source register 7 and destination register 11. This additional register 13 is arranged in the second pipeline stage 3 in FIG. 2, and is coupled to the ALU unit 8.

Figure 3:
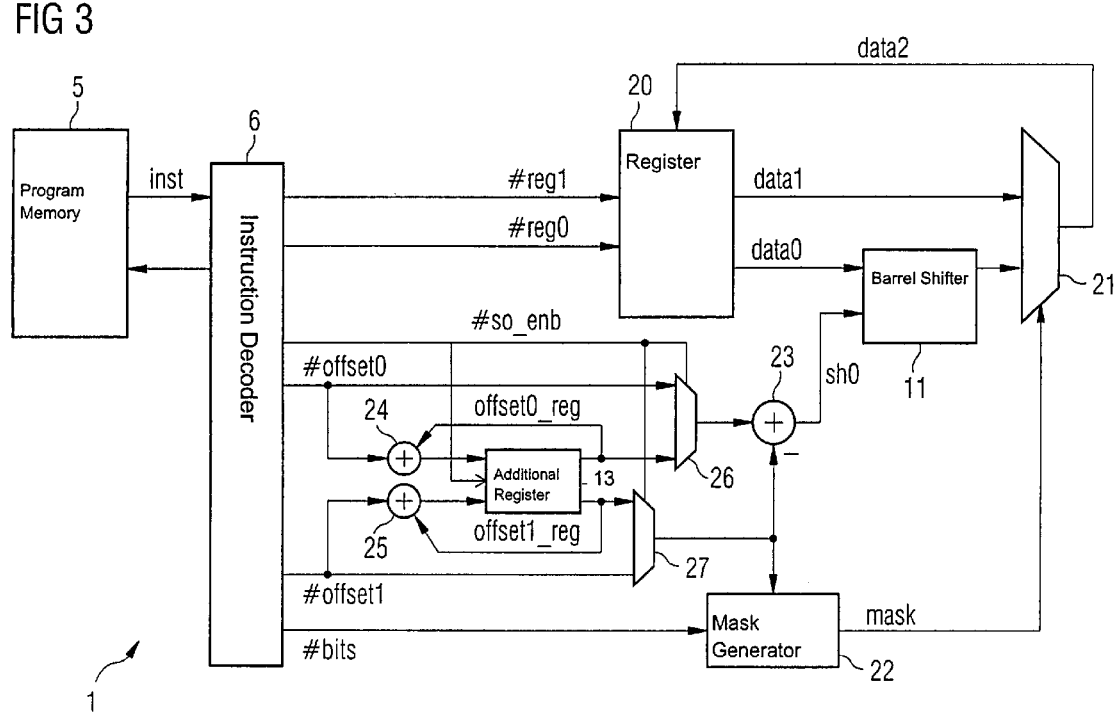
FIG. 3 shows a detailed block diagram in order to illustrate the implementation of the additional register in the programmable unit according to the invention shown in FIG. 2.

FIG. 3 shows a detailed block diagram in order to illustrate the implementation of the additional register for the programmable unit shown in FIG. 2.

The individual instructions inst are read from the program memory 5 and are passed to the instruction decoder 6. The instruction decoder 6 uses the signals #reg0, #reg1 to produce the respective register addresses for the source register Rs and destination register Rd. These signals #reg0, #reg1 are passed to the register 20, with the register 20 including the functionality of the source register 7 and of the destination register 12. Data signals data1, data0 are emitted from the data register 20 as a function of the register addresses #reg0, #reg1 and are passed to a multiplexer 21.

The programmable unit also contains a barrel shifter 11, a mask generator 22 and an adder 23. The elements 11, 22, 23 are used for bit field manipulation. The instruction decoder 6 produces a signal #bits, which indicates the bit length and is passed to the mask generator 22. On this basis, the mask generator 22 produces a mask for bit field manipulation. The method of operation of this bit field manipulation is generally known to those skilled in the art and is described in detail, for example, in the documents already cited in the introduction, so that they will not be described in any more detail here.

On the output side, the instruction decoder 6 also produces two offset signals #offset0, #offset1, which are passed directly to the adder 23 in a first mode of operation. In this first mode of operation, the signal #offset1 is subtracted from the signal #offset0 in the adder 23, and the signal sh0 which results from this is passed to the barrel shifter 11. The barrel shifter 11, which is also supplied with the data signal data0, on this basis produces an output signal which is passed to the multiplexer 21.

The programmable unit has an additional register 13 which, in addition to the first operating mode, allows a second operating mode. The additional register 13 has two inputs and two outputs. An adder 24, 25, respectively, is connected upstream of the inputs of the additional register 13, and the two outputs are followed by a respective multiplexer 26, 27. The output signals offset0_reg, offset1_reg from the additional register 13 are passed on the one hand to the respective downstream multiplexers 26, 27. On the other hand, these signals offset0_reg, offset1_reg are passed via a feedback loop to the respective adders 24, 25, where they are added to the offset signals #offset0, #offset1. The result of each of these addition processes is in each case written to the corresponding input of the additional register 13.

The multiplexers 26, 27 as well as the additional register 13 are controlled via the enable signal #so_enb, which is likewise produced by the instruction decoder 6.

The arrangements illustrated in FIGS. 2 and 3 can be used to provide an implementation of the instruction "Move" and thus bit field manipulation in a very simple, power-saving manner.

The exemplary embodiment described above with reference to FIGS. 1 to 3 related to direct addressing, in which bit field manipulation was carried out. In the following exemplary embodiment, which will be described with reference to FIGS. 4 and 5, the method according to the invention is used for register-indirect addressing of a memory access in which the intention is to carry out a bit field movement. In the case of the "Move" instruction described initially, the method according to the invention in this case leads to the following instructions:

During a read process:

$Rd <= \text{mem}((\text{base\_adr} + \#\text{disp}), \text{bit\_pos}, \#\text{bits})$ During a write process:

$\text{mem}((\text{base\_adr} + \#\text{disp}), \text{bit\_pos}, \#\text{bits}) <= Rs$ In this case, Rs and Rd once again denote the content of the source register and destination register, respectively. Base_adr denotes a start address in the memory, which is in the form of a stack memory. #disp denotes the address displacement between the address and the base address in the stack memory, and bit_pos denotes the bit position pointer. #bits once again denotes the bit length, that is to say the number of bits to be moved. The syntax for the assembler operating language for a read process is thus as follows:

LDX Rd #bits @Rs #disp #auto_increment

In this case, the register @Rs is set as the base address base_adr=Rs [31:5], and the bit pointer bit_pos=Rs [4:0] is set. #auto_increment=1 denotes that the bit position pointer has in each case been moved on by the number of bits #bits. Furthermore, Rs<=Rs+#bits.

The save instruction STX has a similar assembler syntax:

STX @Rd #bits Rs #disp #auto_increment

In this case, the register @Rd with the base address base_adr=Rd [31:5] is set, and the bit position bit_pos=Rd [4:0] is set.

In a simplified implementation, this thus results in the following program procedure for a read instruction:

| | | |
|---|---|---|
| ldi | R4 5 0x030 | //load position pointer = 0x30, bit_pos = 0 |
| ldi | R5 5 0x040 | // load position pointer = 0x40, bit_pos = 0 |
| ldi | R6 0 8 | // process 4 × 8 bits |
| _loop: ldx | R2 8 R4 0x08 1 | // load 0x030 + 0x08 |
| nop | | |
| nop | | |
| addi | R3 R2 1 | |
| str | R5 8 R3 0x080 1 | |
| decibr | R6 l_loop 1 | // decrement by 1; jump instruction if the counter is not 1 |

The position pointers for the stack memory are first of all loaded in accordance with the first two lines of this program. Furthermore, the position pointers bit_pos are set to 0. Line 3 states that 1 byte is in each case processed 8 times. Lines 4 to 9 indicate the program loop according to the invention. In this case, a bit segment is first of all loaded in accordance with line 4, is correspondingly processed in accordance with line 7, and is written back to a corresponding line in the destination register in accordance with line 8. The loop counter is reset by one in accordance with line 9, and the loop commences from the start again until the loop counter has reached zero.

In this case, only nine instructions are required to read and move a data word from the memory, in comparison to the 22 instructions required for the same instruction in the introduction to the description. This results in a considerable reduction in the power consumption.

This method according to the invention for bit field movement with indirect addressing will be explained with reference to the schematic illustration in FIG. 4.

In the case of indirect addressing with displacement, the register content Rs of the source register defines the point in the stack memory 9 from which the data should be read. For this purpose, the source register Rs has a first bit segment 30 which indicates the corresponding address in the memory 9. The signal #disp indicates an address displacement with respect to the address indicated in the source register, which thus defines the current address. A second bit segment 31 contains the position pointer bit_pos, which indicates the point in the current address at which the data with the bit length #bits should be read. This bit segment 32 which is read from the stack memory 9 is then inserted in the bit segment 33 in the destination register with the content Rd.

Figure 4:
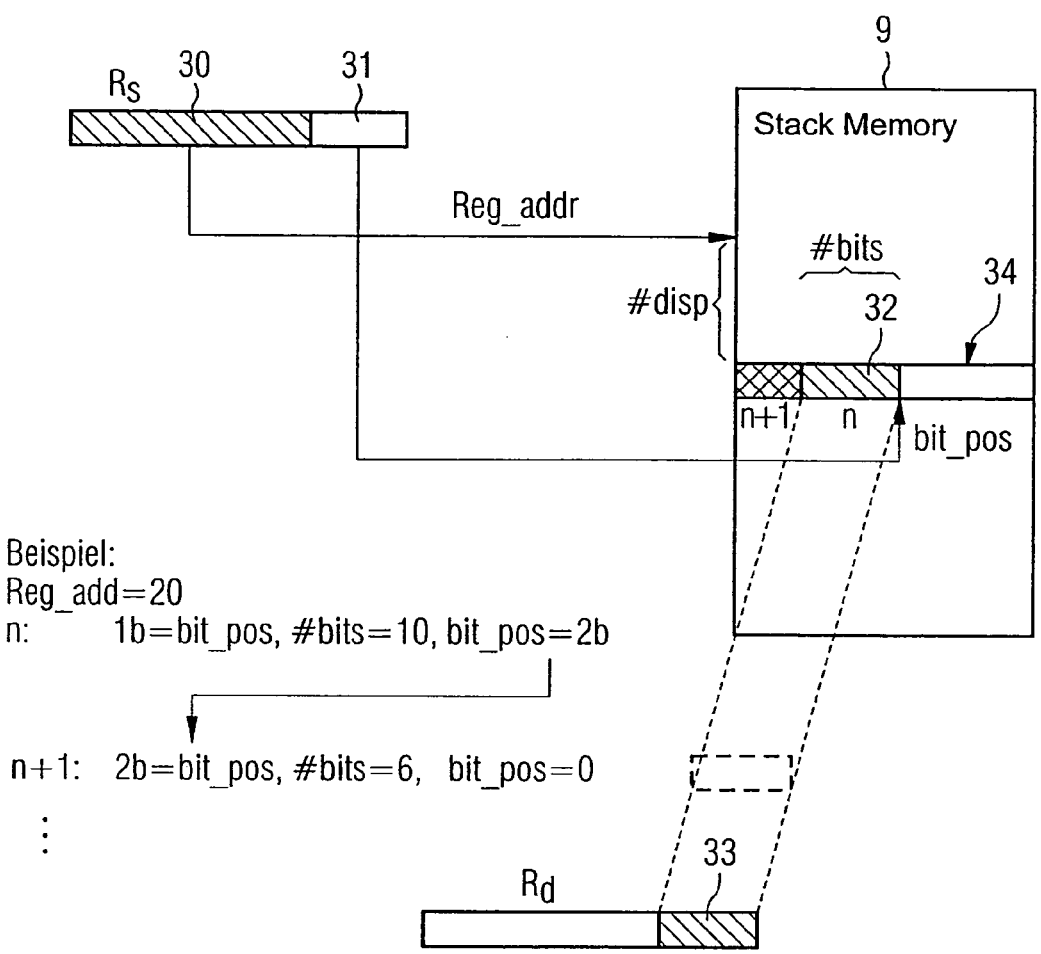
FIG. 4 shows a schematic illustration of the method according to the invention for bit field movement with indirect addressing.

In the example in FIG. 4, the bit segment 32 is in this case written to the bit segment 33 starting with zero in the destination register Rd, but, depending on the implementation, it could also be written to any desired point in the destination register Rd.

With the content Rs of the source register 7 remaining the same, data segments 32 are written continuously from the stack memory 9 to the point 33 in the destination register. The address displacement #disp in this case always remains constant. Only the respective bit position bit_pos is updated, for the next read step.

By way of example, for the first read step n:

n: bit_pos=16; #bits=10

Then, for the next read step n+1 in the case of a 32-bit data word:

n+1: bit_pos=10+16=26; #bits=6

In embodiment, a transfer to the address content in the bit segment 30 is carried out in the situation where the data segment 32 occurs at the end of the corresponding data word 34 in the stack memory 9. In this case, one is added to the address stored in the bit segment 30. This means that the address in the stack memory 9 is decremented by one line so that, assuming that the address displacement is constant, the current address is thus also decremented by one line. The transfer furthermore sets the position pointer to zero as a result of the resetting of the bit position in the bit segment 31, so that the data word can be read, starting with zero, in the next line.

Figure 5:
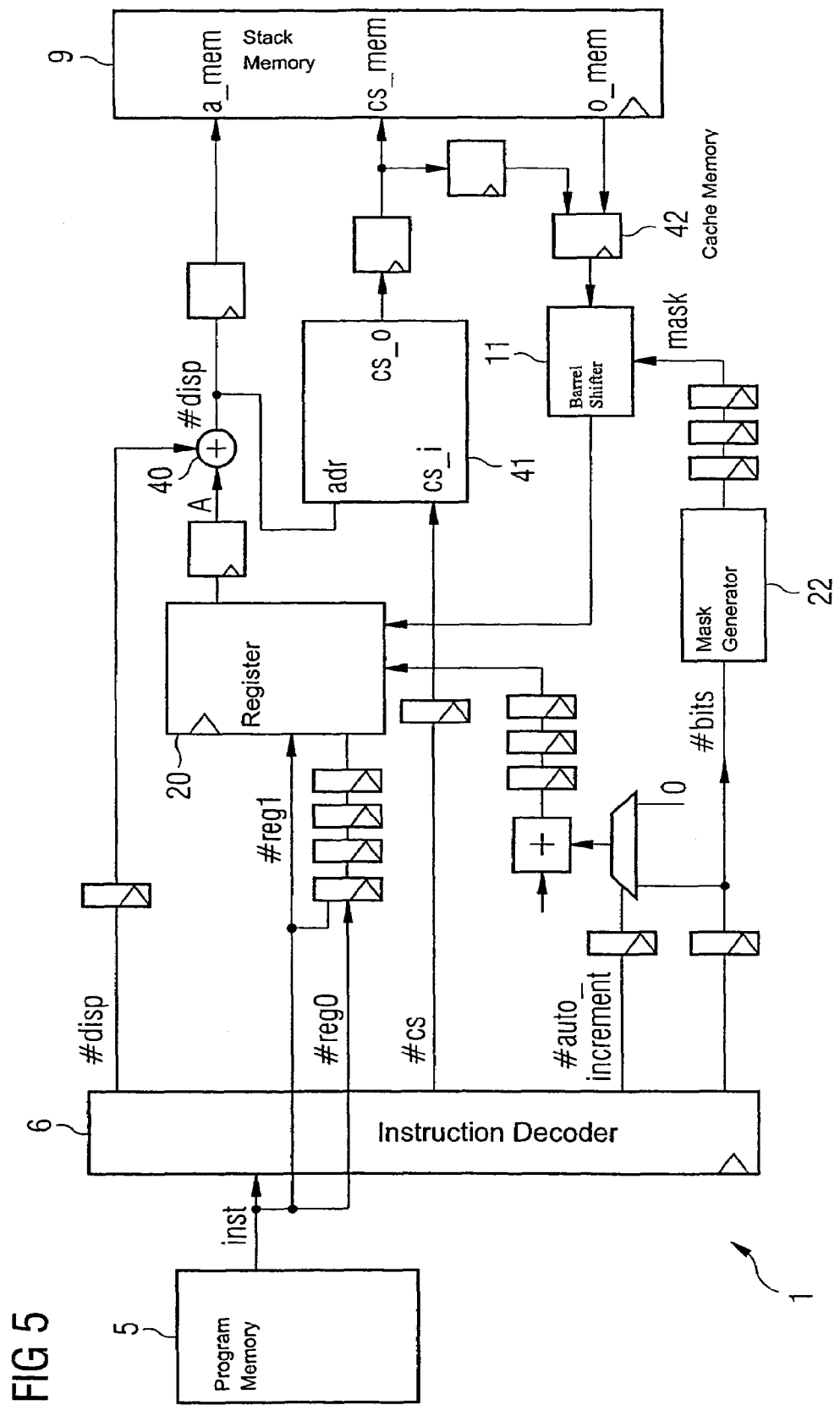
FIG. 5 shows the block diagram of a programmable unit for carrying out a method according to the invention for bit field movement by means of indirect addressing.

FIG. 5 shows the block diagram of a programmable unit for implementation of the method according to the invention for bit field movement by means of indirect addressing as shown in FIG. 4. In the same way as FIG. 3 which has been described above, FIG. 5 shows only a schematic illustration of the programmable unit, that is to say, in particular, functional units which are not directly required for description of the invention have not been illustrated, in order to improve clarity.

In contrast to the direct addressing as shown in FIG. 3, the instruction codes #reg0, #reg1 are not written to the instruction decoder 6, but directly to the register 20. The signals #reg0, #reg1 correspond to the register contents Rs, Rd of the source register and destination register, respectively.

The instruction decoder 6 produces the output signal #disp, which is added in the adder 40 to the output signal A from the register 20. The signal which results from this denotes the current address in the stack memory 9, which is passed to the address input a_mem of the stack memory 9. Starting from the respective current address, a bit segment to be read is passed at an output o_mem of the stack memory 9 to the barrel shifter 11.

The instruction decoder 6 also produces the signal #bits, which is passed to the mask generator 22 which uses it to produce a signal mask, which is passed to the barrel shifter 11. The barrel shifter 11 uses this and the data signal read from the stack memory 9 to produce a shifted data signal, which is written to the destination register 20. The position pointer is also updated, for the next addressing process.

The programmable unit shown in FIG. 5 also has a control unit 41 for controlling the process of reading from the memory 9. Memory access to the stack memory 9 is made possible for the first time by means of the signal #cs, which is supplied from the instruction decoder 6 to the control unit 41. For this purpose, the stack memory 9 has a control input cs_mem, to which a control signal cs_o, which is derived from the signal #cs, can be written for the control unit 41.

The signal #auto_increment, which is likewise produced by the instruction decoder 6, is used to control the incrementation and decrementation of the read and write pointers, respectively, once read and write operations have been carried out.

In one embodiment, a cache memory 42 is provided between the data output o_mem of the memory 9 and the barrel shifter 11. The cache memory 42 is also connected to the output or memory unit 41, so that the control signal cs_o can be applied to it. The respective current address with which the memory 9 is addressed from the register 20 is connected via the input adr of the control unit 41. The control unit 41 compares this current address with addresses which have already previously been written, and in the process determines whether the current address was already previously present. If this comparison shows that the address was already present, then the memory 9 is deactivated via the control signal cs_0. The corresponding data is read from the cache memory 42, instead. The bit segment which is read from the cache memory 42 is shifted via the barrel shifter 11, is masked, via the mask generator 21, and is then written back to the destination register in the register 20, as the new base address. This is dependent on the data corresponding to the respective current address still being available in the cache memory 42. Since this implementation is not just based on access to the stack memory 9, but the corresponding data can be read directly from the cache memory 42, this results in a significant reduction in the energy consumption.

Although the present invention has been described above with reference to one preferred exemplary embodiment, it is not restricted to this but can be modified in many ways.

For example, the programmable unit may be in the form of a microcontroller, microprocessor, signal processor or the like. In this case, it may be a processor with a pipeline architecture or a protocol processor.

Furthermore, the invention has been described above on the basis of a 32-bit processor architecture, but it is not restricted to this. In fact, any desired processor architecture can be provided here, with 64 bits, 16 bits, 8 bits or any other desired bit length.

In addition, the present invention is not restricted to the types of addressing described above, specifically direct register addressing or indirect register addressing with displacement, but can be extended to any desired types of addressing.

Furthermore, the stated pipeline structure may also have more or less than three stages.

Furthermore, the invention is not restricted to reading from and writing to memories in the form of registers but, within the scope of the invention, can be extended to reading from and writing to any desired memories, for example address or data registers, as well as data memories such as RAM, SRAM, etc.

In the present exemplary embodiments, the first and/or the second bit field are/is in the form of a data word with a length of 32 bits, and the bit segment to be read has a length of 8 bits. However, the invention is not restricted to this but can, of course, be extended to bit fields with any desired number of bits. The only important factor is that the bit segments do not have a greater bit length than the bit fields.

It is therefore intended that the foregoing detailed description be regarded as illustrative rather than limiting, and that it be understood that it is the following claims, including all equivalents, that are intended to define the spirit and scope of this invention. Nor is anything in the foregoing description intended to disavow scope of the invention as claimed or any equivalents thereof.

The invention claimed is:

1. A method for sequentially reading out continuous bit segments of a data string by means of bit field shifting using variable bit positions, the method comprising:
providing a pipeline structure comprising programmable unit which comprises a first and second memory unit and an additional register, wherein in the additional register a first and a second start point are stored in order to be able to read out the corresponding bit segment from the first memory unit and in order to be able to store the corresponding bit segment into the second memory unit, respectively;
embedding recurring program steps of programmable unit within a program loop, the program steps comprising:
(a) reading out a first bit segment of a data string to be read with a first bit length from a first bit field in the first memory unit starting at the first start point;
(b) shifting and storing the bit segment that has been read in the first bit field of the second memory unit staring at the second start point;
(c) updating the first and the second start points by incrementing the first and second start points by a predetermined offset-value;
(d) storing the first and the second start points in the additional register; and
(e) returning to step (a) to read out the further bit segments of the data string to be read.

2. The method according to claim 1, wherein an initialization process is carried out before step (b).

3. The method according to claim 1, wherein at least one of the start points or addresses are reset before step (b).

4. The method according to claim 1, wherein the bit segment which has been read is processed between step (b) and step (d).

5. The method according to claim 1, wherein the predetermined value is a first offset value for the first start point and a second offset value for the second start point.

6. The method according to claim 5, wherein the first offset value is equal to the second offset value.

7. The method according to claim 5, wherein at least one of the first offset value or the second offset value corresponds and is equal to a bit length of the bit segment.

8. The method according to claim 5, wherein the offset values are updated by addition of a bit length.

9. The method according to claim 1, wherein the first and second start points are not identical.

10. The method according to claim 1, wherein the method is used for bit field manipulation.

11. The method according to claim 1, wherein the method is used for direct register addressing, the first memory unit comprises a source register for, and the second memory unit comprises a destination register.

12. The method according to claim 1, wherein the method is used for register-indirect addressing of a memory, the first memory unit comprises a semiconductor memory or a stack memory, and the second memory unit comprises a destination register.

13. The method according to claim 1, further comprising:
storing a last address for a memory access on the first memory unit;
comparing a current address with the last stored address for a memory access on the first memory unit; and
not reading the first memory unit if a comparison of the current and stored addresses shows that the current and stored addresses are the same.

14. The method according to claim 1, further comprising:
storing a last address for a memory access on the first memory unit;
comparing a current address with the last stored address for a memory access on the first memory unit; and
reading the first memory unit if a comparison of the current and stored addresses shows that the current and stored addresses are not the same.

15. The method according to claim 14, wherein data from the first memory unit is written to a cache memory.

16. The method according to claim 1, wherein the bit segments which are associated with a current address are read from a cache memory to the second memory unit.

17. The method according to claim 1, wherein a transfer to an address which is associated with the bit field is carried out if a bit segment within the first bit field occurs at an end of a corresponding bit field.

18. The method according to claim 17, wherein one is added to the address associated with the bit field during the transfer.

19. The method according to claim 1, wherein the bit segment is a component of a data item to be read and to be processed.

20. The method according to claim 1, wherein the bit segment is a component of an address to be read and to be processed.

21. The method according to claim 1, wherein the bit fields contain a data word, a fraction of a data word, or a multiple of a data word.

22. The method according to claim 1, wherein different bit fields are processed successively when an instruction is executed repeatedly.

23. A pipeline structure comprising programmable unit for processing instructions by sequentially reading out continuous bit segments of a data string by means of bit field shifting using variable bit positions, the programmable unit comprising:
a first memory unit;
a second memory unit;
an additional register, wherein in the additional register a first and a second start point are stored in order to be able to read out the corresponding bit segment from the first memory unit and in order to be able to store the corresponding bit segment into the second memory unit, respectively;
a first device for bit field shifting which comprises a program loop for recurring program steps of the programmable unit, which shifts a first bit segment within a first bit field to an area in the second bit field; and
a second device for calculating an update of the first and the second start points by incrementing these start points by a predetermined offset-value.

24. The programmable unit according to claim 23, wherein an instruction decoder is provided for reading and decoding of an instruction from the memory.

25. The programmable unit according to claim 23, wherein:
the memory unit contains first and second memory units, and
for direct register addressing, the first memory unit comprises a source register, and a second memory unit comprises a destination register.

26. The programmable unit according to claim 23, wherein:
the memory unit contains first and second memory units, and
for register-indirect addressing, the first memory unit comprises a semiconductor memory or a stack memory, and the second memory unit comprises a destination register.

27. The programmable unit according to claim 23, further comprising a bridge, by means of which the additional register can be bridged or switched on as a function of an enable signal.

28. The programmable unit according to claim 23, further comprising a control unit, wherein:
the memory unit contains first and second memory units, and
the control unit compares a current address with address which already existed previously for addressing of the first memory unit, and the first memory unit is set to be inactive or is bridged when the comparison shows that the current address already existed previously.

29. The programmable unit according to claim 28, further comprising a cache memory, the bit segments which are associated with the current address are read from the cache memory to the second memory unit when the control unit finds that the current address already existed previously.

* * * * *

UNITED STATES PATENT AND TRADEMARK OFFICE
CERTIFICATE OF CORRECTION

PATENT NO.        : 7,444,488 B2                               Page 1 of 1
APPLICATION NO. : 11/241844
DATED             : October 28, 2008
INVENTOR(S)       : Xiaoning Nie et al.

It is certified that error appears in the above-identified patent and that said Letters Patent is hereby corrected as shown below:

In column 11, in claim 1, line 18, after "second memory unit" delete "staring" and substitute --starting-- in its place.

In column 11, in claim 11, line 3, after "comprises a source" delete "register for," and substitute --register,-- in its place.

In column 14, in claim 28, line 5, after "a current address with" delete "address" and substitute --addresses-- in its place.

Signed and Sealed this

Twenty-fourth Day of March, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,444,488 B2
APPLICATION NO. : 11/241844
DATED : October 28, 2008
INVENTOR(S) : Xiaoning Nie et al.

Page 1 of 1

It is certified that error appears in the above-identified patent and that said Letters Patent is hereby corrected as shown below:

In column 11, in claim 1, line 31, after "second memory unit" delete "staring" and substitute --starting-- in its place.

In column 11, in claim 11, line 64, after "comprises a source" delete "register for," and substitute --register,-- in its place.

In column 14, in claim 28, line 5, after "a current address with" delete "address" and substitute --addresses-- in its place.

This certificate supersedes the Certificate of Correction issued March 24, 2009.

Signed and Sealed this

Fourteenth Day of April, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,444,488 B2  Page 1 of 1
APPLICATION NO. : 11/241844
DATED : October 28, 2008
INVENTOR(S) : Xiaoning Nie et al.

It is certified that error appears in the above-identified patent and that said Letters Patent is hereby corrected as shown below:

On the Title Page

Item (73), delete "Technologies," and substitute --Technologies AG,-- in its place.

Signed and Sealed this

Eighth Day of December, 2009

David J. Kappos
*Director of the United States Patent and Trademark Office*